US012641410B2

(12) United States Patent
Stirling et al.

(10) Patent No.: US 12,641,410 B2
(45) Date of Patent: May 26, 2026

(54) OPTIMIZING ROAMING TO MITIGATE STICKY CLIENTS VIA MACHINE LEARNING

(71) Applicant: Cisco Technology, Inc., San Jose, CA (US)

(72) Inventors: Tim Stirling, Vaud (CH); Ramprasad Ramprasad N N R, Bangalore (IN); Federico Lovison, Fontanelle (IT)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 18/465,440

(22) Filed: Sep. 12, 2023

(65) Prior Publication Data

US 2024/0381067 A1 Nov. 14, 2024

(30) Foreign Application Priority Data

May 12, 2023 (IN) .............................. 202341033558

(51) Int. Cl.
*H04W 8/12* (2009.01)
*H04L 41/16* (2022.01)

(52) U.S. Cl.
CPC .............. *H04W 8/12* (2013.01); *H04L 41/16* (2013.01)

(58) Field of Classification Search
CPC ................................. H04W 8/12; H04L 41/16
See application file for complete search history.

(56) References Cited

U.S. PATENT DOCUMENTS

| | | | |
|---|---|---|---|
| 2012/0263141 A1* | 10/2012 | Taghavi Nasrabadi ..................... | |
| | | | H04L 27/2613 |
| | | | 370/330 |
| 2019/0191369 A1 | 6/2019 | Desai et al. | |
| 2019/0260559 A1* | 8/2019 | Wu ....................... H04L 1/1874 | |
| 2019/0297546 A1 | 9/2019 | Likar et al. | |
| 2022/0255799 A1 | 8/2022 | Singla et al. | |
| 2022/0330047 A1 | 10/2022 | Wang et al. | |
| 2023/0091127 A1 | 3/2023 | Lin et al. | |

* cited by examiner

*Primary Examiner* — Kenny S Lin

(74) *Attorney, Agent, or Firm* — Ruan & Tucker, LLP; Ravi Mohan; Marc McClain

(57) ABSTRACT

Devices, systems, methods, and processes for tackling the problem of sticky clients in wireless networks using machine learning processes are described herein. Thresholds related to data rates and/or Received Signal Strength Indicators (RSSI), for Access Points (APs) in a network are identified. These thresholds are configured to dynamically adjust, either based on the time of day or real-time roaming patterns, with the aim of mitigating sticky clients and enhancing overall network performance. Advanced machine learning techniques such as Graph Neural Networks are implemented within the domain of deep learning to significantly alleviate sticky client concerns and promote seamless connectivity for all users.

10 Claims, 11 Drawing Sheets

DEFAULT COVERAGE AREA

MANUAL COVERAGE AREA

REFINED COVERAGE AREA

COVERAGE HOLE

SIGNAL LIMIT

DEFAULT COVERAGE AREA

MANUAL COVERAGE AREA

REFINED COVERAGE AREA

700

COUPLE TO A PLURALITY OF NETWORK DEVICES — 710

SELECT A MINIMUM RECEIVED SIGNAL STRENGTH INDICATOR (RSSI) LEVEL — 720

SET A DISASSOCIATION THRESHOLD BASED ON THE MINIMUM RSSI LEVEL — 730

DETERMINE THE RSSI LEVEL FOR EACH OF THE PLURALITY OF NETWORK DEVICES — 740

DISASSOCIATE FROM EACH OF THE PLURALITY OF NETWORK DEVICES THAT HAVE AN RSSI LEVEL BELOW THE DISASSOCIATION THRESHOLD — 750

*800*

COUPLE TO A PLURALITY OF NETWORK DEVICES ~810

SELECT A MINIMUM MODULATION AND
CODING SCHEME (MCS) RATE ~820

SET A DISASSOCIATION THRESHOLD BASED
ON THE MINIMUM MCS RATE ~830

DETERMINE THE MCS RATE FOR EACH OF THE
PLURALITY OF NETWORK DEVICES ~840

DISASSOCIATE FROM EACH OF THE PLURALITY OF
NETWORK DEVICES THAT HAVE AN MCS RATE
BELOW THE DISASSOCIATION THRESHOLD ~850

*900*

COUPLE TO A PLURALITY OF NETWORK DEVICES —910

ACCESS TOPOLOGY DATA —920

GENERATE A REFINED COVERAGE AREA BASED
ON THE TOPOLOGY DATA —930

DETERMINE IF EACH OF THE PLURALITY OF NETWORK
DEVICES IS WITHIN THE REFINED COVERAGE AREA —940

DISASSOCIATE WITH EACH OF THE PLURALITY OF
NETWORK DEVICES THAT ARE DETERMINED TO BE
OUTSIDE OF THE REFINED COVERAGE AREA —950

FIG. 10

OPTIMIZING ROAMING TO MITIGATE STICKY CLIENTS VIA MACHINE LEARNING

The present disclosure relates to networking. More particularly, the present disclosure relates to mitigating sticky clients using machine learning processes to discover near-optimal assignments of data rate or RSSI thresholds to all APs in a network.

PRIORITY

This application claims the benefit of and priority to Indian Provisional Application No. 202341033558, filed May 12, 2023, which is incorporated in its entirety herein.

BACKGROUND

Although several extensions to the 802.11 standard have been released to improve roaming by aiding clients, a fundamental impediment is that the process of a client deciding to dissociate from one access point ("AP") and reassociate to a new AP, with preferably a superior radio frequency (RF) connection is controlled entirely by the client itself.

Certain "sticky" clients remain connected to an AP with a poor RSSI even although alternative APs may provide a stronger RSSI and thus a better connection and hence application experience. Not only does this impact the client, but importantly, all clients connected to the AP may be severely impacted because clients with a low RSSI will communicate at low data rates using lower modulation and coding schemes (MCSs) for successful packet delivery, which takes a higher proportion of the airtime that is shared between all clients. Consequently, other clients that have successfully roamed to appropriate APs may experience diminished network performance.

In general, network administrators utilize data rate and RSSI control to try to reduce the occurrence of sticky clients. Both approaches have limitations, however. For example, the thresholds for data rate and RSSI must be manually specified and are typically left at default values. These fixed values are often not optimal because the roaming characteristic of clients depends upon non-linear interactions between specific client hardware and software, the WiFi network topology, and the physical environment where users can move about. There is a trade-off between restricting lower data rates or RSSI thresholds and reducing the supported coverage area of the APs, which might lead to coverage holes. Furthermore, the defined threshold of a single AP might interact with neighboring APs, by forcing clients to roam to alternative APs, and thus the optimization must be considered across the entire network.

SUMMARY OF THE DISCLOSURE

Systems and methods for mitigating sticky clients using machine learning processes to discover near-optimal assignments of data rate or RSSI thresholds to all APs in a network in accordance with embodiments of the disclosure are described herein. In some embodiments, a device, includes a processor, at least one network interface controller configured to provide access to a network, and a memory communicatively coupled to the processor, wherein the memory includes a client roaming logic. The logic is configured to communicatively couple to a plurality of network devices, wherein each of the plurality of network devices has an associated modulation and coding ("MCS") rate, generate a refined coverage area, wherein the refined coverage area is associated with a minimum MCS rate, and disassociate from each of the plurality of network devices that have an MCS rate below the minimum MCS rate.

In some embodiments, the refined coverage area is defined as a disassociation threshold.

In some embodiments, the client roaming logic is further configured to determine a current MCS rate of each of the plurality of network devices.

In some embodiments, disassociation includes comparing the determined current MCS rate of a network device against the minimum MCS rate.

In some embodiments, the refined coverage area is generated via one or more machine learning processes.

In some embodiments, the one or more machine learning processes includes at least a graph neural network.

In some embodiments, the client roaming logic is further configured to determine if a triggering event has occurred.

In some embodiments, in response to a triggering event occurring, the client roaming logic is further configured to generate an updated refined coverage area.

In some embodiments, the updated refined coverage area is associated with a second minimum MCS rate.

In some embodiments, the client roaming logic is further configured to disassociate from each of the plurality of network devices that have an MCS rate below the second minimum MCS rate.

In some embodiments, a device, includes a processor, at least one network interface controller configured to provide access to a network, and a memory communicatively coupled to the processor, wherein the memory includes a client roaming logic. The logic is configured to communicatively couple to a plurality of network devices, wherein each of the plurality of network devices has an associated received signal strength indicator ("RSSI") level, generate a refined coverage area, wherein the refined coverage area is associated with a minimum RSSI level, and disassociate from each of the plurality of network devices that have an RSSI level below the minimum RSSI level.

In some embodiments, disassociating includes ignoring messages sent from each of the plurality of network devices that have an RSSI level below the minimum RSSI level.

In some embodiments, disassociating includes sending a de-authentication message to each of the plurality of network devices that have an RSSI level below the minimum RSSI level.

In some embodiments, wherein the refined coverage area is generated via one or more machine learning processes.

In some embodiments, the one or more machine learning processes includes at least a graph neural network.

In some embodiments, the client roaming logic is further configured to determine if a triggering event has occurred.

In some embodiments, the generation of the refined coverage area is based on topology data wherein the topology data is associated with the topology of the network.

In some embodiments, the triggering event is a change in topology data.

In some embodiments, a method of managing roaming network devices includes coupling to a plurality of network devices over a network, generate a refined coverage area, evaluate each of the plurality of network devices, determine if the evaluated network device is within the refined coverage area, and disassociate from each of the plurality of network devices that are outside of the refined coverage area.

In some embodiments, the method further includes monitoring the network for a triggering event and generating an updated refined coverage area in response to a triggering event.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 3 is a conceptual illustration of mitigating coverage holes in accordance with various embodiments of the disclosure;

FIG. 10 is a flowchart depicting a process for generating a refined coverage area using machine learning in accordance with various embodiments of the disclosure.

Figure 1:
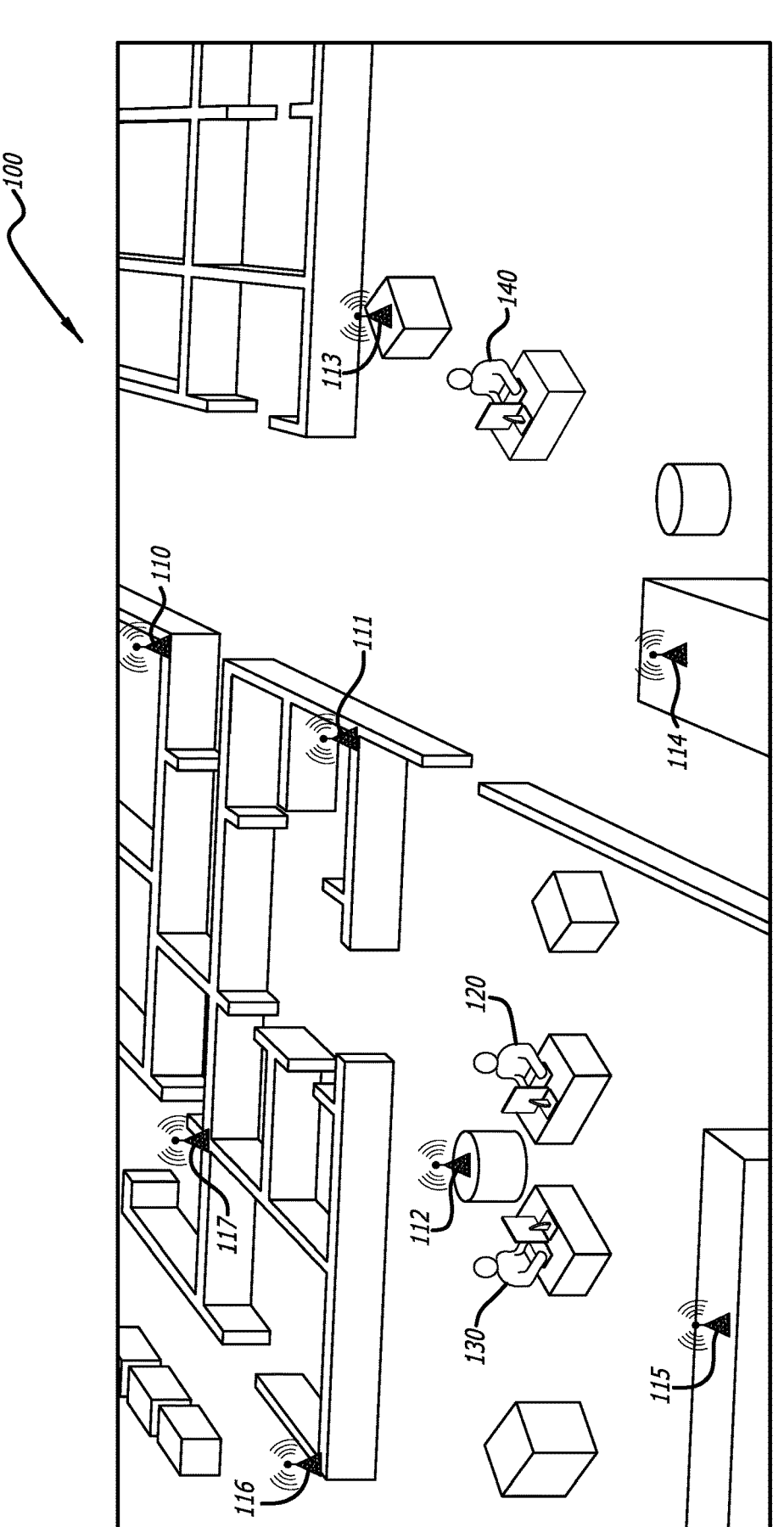
FIG. 1 is a conceptual illustration of a deployment of network devices within a floorplan suitable for mitigating sticky clients using machine learning processes in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that mitigate sticky clients using one or more machine learning processes to discover near-optimal assignments of thresholds corresponding to data rates and/or RSSI, with respect to one or more APs in a network. These thresholds may be configured to dynamically adjust, for example, based on the time of day or real-time roaming patterns, with the aim of mitigating sticky clients and enhancing overall network performance. Advanced machine learning techniques such as Graph Neural Networks are implemented within the domain of deep learning to significantly alleviate sticky client concerns and promote seamless connectivity for all users.

In many embodiments, addressing the issue of sticky clients can be effectively achieved through the utilization of machine learning techniques, aimed at identifying optimal parameter assignments for APs within a network. To tackle the intricacies posed by extensive networks, conventional machine learning tools may prove inadequate. Consequently, in many embodiments, methodologies rooted in deep learning leverage the power of Graph Neural Networks (GNNs). GNNs can adeptly handle the intricate relationships and interactions present in large-scale networks, making them well-suited for optimizing threshold settings.

In many embodiments, a minimum data rate threshold, or minimum RSSI threshold for example, is optimized so that an AP will support associated clients. Optimization may be performed using machine learning techniques applied to a data set that includes historic client and AP telemetry collected from the WiFi network that is to be optimized. Ideally, the data set includes the client's RSSI with respect to its associated AP and neighboring APs, and either the RSSI between neighboring APs or simply the geometric positions of the APs that can be used to determine the distance between APs. It should be appreciated that collecting specific information such as a client's RSSI readings in relation to its connected AP, as well as neighboring APs, offers valuable insights for optimizing the roaming experience. For example, RSSI values provide a measure of signal strength, indicating how well a device is communicating with a particular AP. By gathering RSSI data for both the current AP and nearby APs, network administrators can gauge the quality of connections and anticipate potential drops in signal strength as a device moves between APs.

Furthermore, including RSSI measurements between neighboring APs or utilizing the geometric positions of APs can serve two crucial purposes. First, the RSSI values between neighboring APs offer an understanding of signal overlap and interference between access points. This insight aids in determining the most opportune time for a device to switch to a new AP to ensure seamless connectivity without signal disruptions. Second, the geometric positions of APs enable the calculation of distances between them. This distance information is highly useful for estimating the physical location of devices based on their signal strengths, a technique often used in location-based services or asset tracking. In many embodiments, by collecting or otherwise analyzing these data points, network operators can dynamically assess the best possible time for a device to transition between APs and decide which AP would offer the strongest signal in a given area. This approach ensures that roaming devices experience minimal interruptions and enjoy consistently reliable connections, enhancing user satisfaction and overall network performance. In essence, the collected data empowers intelligent decision-making to facilitate smoother roaming and improved wireless communication within the network.

In many embodiments, telemetry data is accessible on various network management systems. It is envisioned that the telemetry data may include real-time insights that offer a comprehensive view of network dynamics and performance. For example, telemetry data may be used as a dynamic feedback mechanism, providing continuous updates on various network parameters crucial for effective administration and optimization. In some embodiments, telemetry data encompasses critical information such as interface-level statistics. This includes metrics like bandwidth utilization, error rates, and packet counts, offering a granular understanding of network congestion and potential anomalies. Moreover, telemetry offers detailed visibility into traffic flows, aiding in the analysis of application behavior and identification of potential security threats.

Similarly, telemetry data may encompass aspects of network or device health and operational status. It furnishes data on metrics such as CPU utilization, memory consumption, and power supply conditions. By monitoring these variables, administrators can ensure devices operate within optimal operational thresholds, thereby mitigating the risk of failures due to resource exhaustion or overheating. Additionally, telemetry data may include routing and switching metrics. This includes critical insights such as routing table updates and convergence times, which are pivotal for maintaining efficient data transmission and network stability. Moreover, telemetry provides a vantage point into Quality of Service (QoS) parameters, encompassing packet loss rates, jitter, and latency for distinct traffic classes. Such data is foundational for effective QoS management to guarantee the prioritization of critical applications. In the context of wireless networks, telemetry may include details regarding wireless-specific metrics, including signal strength, channel utilization, and roaming patterns. This information empowers administrators to optimize wireless coverage and ensure seamless connectivity.

In some embodiments, client RSSI data is used to determine sticky clients, their expected connection health, and the set of APs the client could reassociate to if the optimized thresholds were enforced by the APs. This enables a method to evaluate the expected performance of modifying the thresholds. The inter-AP RSSI or the inter-AP distances may be used to create a graph of interacting APs, noting that changing a threshold on a specific AP could impact the choice of optimal threshold for nearby APs and thus this interaction may be modeled.

It should be understood that the inclusion of inter-AP RSSI values or inter-AP distances introduces a dimension of complexity that enriches the roaming optimization strategy. These values can be leveraged to construct an intricate graph, wherein each AP interacts with its neighboring counterparts. This graph representation captures the intricate relationships between APs, becoming a critical element in the evaluation of threshold adjustments. To that end, it is important to acknowledge that altering a threshold on a specific AP can ripple through the network, influencing the most favorable threshold choices for nearby APs. This dynamic interplay necessitates a thorough modeling of AP interactions to derive accurate predictions of how changes in one AP's threshold could potentially reverberate across the network.

In many embodiments, the interaction between APs in the graph can be visualized as a web of dependencies. Adjusting a threshold on one AP triggers a cascade effect, impacting neighboring APs that are interconnected through signal strength correlations or physical proximity. Consequently, an optimization procedure that optimally balances these dependencies is essential for achieving the desired seamless roaming experience. By encapsulating this intricate web of interactions into a coherent model, network administrators gain the ability to anticipate the systemic implications of threshold adjustments and can devise strategies to mitigate any unintended consequences that might arise.

Embodiments as described herein are not restricted to a specific ML algorithm and a variety of different methods suitable for combinatorial optimization could apply. For example, in many embodiments, a deep learning Graph Neural Network (GNN) may be utilized. GNNs have been shown to optimally solve optimization problems where the inherent data can be represented as a graph. This makes GNNs particularly appropriate to solve the problem of assigning optimal data rate or RSSI thresholds to APs in a network due to the inherent interaction between neighboring APs which will be propagated across the network. An advantage of GNNs is that they can rapidly converge to near-optimal solutions using modest computational resources.

Due to the ability of ML methods like GNNs to rapidly provide a solution to the assignment of thresholds across very large WiFi networks, different implementations could be realized. For example, in many embodiments, an assignment of thresholds could be fixed, whereby each AP includes a customized optimal threshold that can be configured. This assignment could be periodically updated. In this scenario, each AP may be equipped with an individually tailored optimal threshold, configured to align with the unique characteristics of that specific AP and its corresponding coverage area. This strategy acknowledges that different APs might experience varying signal strengths and interference patterns based on their physical location, environmental factors, and the devices they serve.

In many embodiments, the rationale behind customized thresholds lies in the recognition that a one-size-fits-all approach might not be optimal for every AP in the network. By calibrating thresholds to the distinct circumstances of each AP, network administrators can optimize the roaming behavior for devices connected to that AP. For instance, APs located in densely populated areas might require more conservative threshold settings to avoid undue interference, while those in more open spaces could benefit from slightly different settings to facilitate seamless transitions for devices on the move. While these threshold assignments are initially configured, it is important to note that they are not etched in stone and may be changed as needed. For example, in some embodiments, the network management system may be configured to regularly assesses the performance of each AP, evaluate the effectiveness of the existing threshold assignment, and make adjustments as needed. Such updates might be triggered by changes in network dynamics, alterations in usage patterns, or advancements in technology that impact the optimal threshold criteria. By incorporating both customized threshold assignment and periodic updates, the network aims to strike a balance between static configurations and the need to evolve with the ever-changing landscape of wireless communication. This approach holds the potential to enhance network performance by addressing roaming issues while maintaining flexibility to accommodate unforeseen changes and improvements in the network environment over time.

Similarly, in many embodiments, thresholds may not be fixed but could vary based on the time of day, day of the week or other properties such as the number of observed roaming clients, without limitation. By integrating this temporal dimension, insights may be gained from varying usage trends observed during different time periods. It is envisioned that temporal sensitivity plays a pivotal role in tailoring thresholds to provide optimal network performance under diverse conditions. For instance, during off-peak hours with relatively fewer active clients, the dynamic threshold adjustment mechanism might choose to relax one or more criteria. This strategic relaxation aims to maximize the network's coverage, ensuring that available resources are efficiently utilized to provide broader connectivity reach. In the alternative, during peak usage times or periods when sticky clients become more pronounced, the dynamic threshold adaptation could adopt a more stringent stance. This judicious adjustment assists in mitigating the detrimental effects of sticky clients, thereby safeguarding network quality, and ensuring consistent performance for all users.

To that end, in many embodiments, a dataset of RSSI readings may be segmented based on parameters such as time of day. This segmentation empowers the network management system to discern how network behavior and client patterns evolve across different temporal contexts. By employing machine learning techniques, the system can then infer optimal threshold settings for each segmented period. This inference process enables the network to autonomously adjust its behavior, seamlessly transitioning between different threshold configurations based on the observed patterns.

Similarly, in many embodiments, one or more thresholds may be dynamically optimized in real-time by considering recent telemetry data. This could prove valuable in environments that experience widely varying but unpredictable changes in client activity and roaming characteristics, for example at a large conference venue.

In a further embodiment, different characteristics of the connected client could be used to generate alternative threshold assignments. It is known that different client hardware, software and user roaming habits can impact the occurrence of sticky clients, for example smartphones are typically optimized for home environments instead of enterprise environments. In this scenario, where the network encounters varying ratios of client types with unpredictable timing, a data-driven approach emerges as a solution. By harnessing the historic telemetry data accumulated over time, network administrators can discern patterns and correlations between specific client characteristics and the prevalence of sticky clients. This historical learning process forms the foundation for deriving contextually specific threshold assignments that are tailored to the unique attributes of each client type.

In many embodiments a Wireless LAN Controller (WLC) or similar device may be used to gain insights through historical telemetry data. For example, the WLC can dynamically instruct one or more APs to apply specific threshold settings based on the observed client characteristics at any given moment. This dynamic interaction between the WLC and the APs ensures that the network continually adapts its threshold configuration to match the characteristics of the connected clients. By effectively applying alternative threshold assignments driven by client characteristics, the network optimizes its responsiveness to the diverse behaviors exhibited by different types of devices. This strategy not only minimizes the occurrence of sticky clients but also enhances the overall network performance by tailoring the connection experience to match the specific needs of each client category. In essence, this data-driven and client-centric approach transforms the network into a dynamic, adaptable entity that harnesses historical insights to foster a seamless and efficient connectivity environment.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages.

The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a deployment of network devices within a floorplan suitable for management with a sustainable network configuration in accordance with various embodiments of the disclosure is shown. In many embodiments, a floorplan 100 can be selected for applying a sustainable network configuration between various access points. Although the floorplan 100 depicted in the embodiment of FIG. 1 is an office environment, it is contemplated that a floorplan may be any environment that includes a plurality of access points distributed throughout an area. In additional embodiments, an area may have multiple floorplans and access points may be associated with multiple floorplans. Indeed, in certain embodiments, a floorplan may be defined as a collection of access points and the area that those access points cover.

In the embodiment depicted in FIG. 1, the floorplan 100 has a first access point 110 at an entranceway to the area. Likewise, a second access point 111 can be placed centrally within the floorplan 100. Within the floorplan 100, three people are depicted working at desk workstations. The first person 120 and second person 130 are working next to a third access point 112. A third person 140 is working next to a fourth access point 113. Additional access points are distributed throughout the floorplan 100 to provide additional wireless signal coverage including a fifth access point 114, a sixth access point 115, a seventh access point 116, and an eighth access point 117.

Traditionally, all access points may be fully powered and operating throughout the day. However, within the embodiment of FIG. 1, the first person 120 and second person 130 may be fully served by the third access point 112. Similarly, the third person 140 may be fully served by the connection provided by the fourth access point 113. Therefore, as described in more detail below, a number of access points may be selectively powered down, de-energized into a lower-power mode, or have one or more transceivers adjusted or turned off. This powering down may include powering down the entire unit to a sleep mode but may also include powering down or adjusting one or more transceivers within the access point. In a number of embodiments, the access points can be configured with multiple transceivers that are configured for different bands of usage. These bands of usage may be a higher-frequency band, or a lower-frequency band. The higher-frequency band may provide enhanced signal readings and data transfer throughput, but often require additional energy to operate at a similar range compared to a transceiver configured for use on a lower-frequency band.

Powering down access points and/or their transceivers can provide significant savings in overall electricity usage within the floorplan 100. However, powering down these elements within a network can cause problems when additional traffic suddenly enters the floorplan 100. For example, additional people may walk into the floorplan 100 from an outside area. If the first access point 110 was powered down into a sleep mode or has one or more transceivers turned off or configured in a certain manner, there may be situations where the time it takes to wake from the sleep mode or repower and/or reconfigure a transceiver is too long to provide adequate coverage and/or service to the additional people. This can negatively affect service level agreements (SLAs) as well as the overall user experience. Thus, in a variety of embodiments, any powering down within the floorplan 100 should be weighed against the time it may take to sufficiently satisfy a sudden increase in network traffic against the amount of time that may be needed to reboot or bring back online the network devices that are in a lower-power mode.

As a result, in the embodiment depicted in FIG. 1, a potential minimal energization configuration (i.e., sustainable network configuration) may be generated by a device, controller, or other logic, such as a network capacity prediction logic, to include operating the first access point 110 at a lower-power setting (e.g., powering down one or more transceivers) until it detects additional people entering the floorplan 100, which can trigger a higher-power setting based on the capabilities of that device. However, the second access point 111 may be powered off into a full sleep mode because the third access point 112 is sufficiently serving the first person 120 and second person 130 while the fourth access point 113 is also sufficiently serving the third person 140. Therefore, the third access point 112 and the fourth access point 113 may be operating at full and normal capacity or within a lower-power capacity that can sufficiently provide bandwidth capacity to the clients utilized by the third person 140. The fifth access point 114, sixth access point 115, seventh access point 116, and eighth access point 117 may also power down into a lower-power mode until one or more triggering events occurs to initiate the generation or update of a sustainable network configuration associated with the devices to hand off or re-associate clients during power up of the devices within the floorplan 100.

Although a specific embodiment for a conceptual illustration of a deployment of network devices within a floorplan suitable for management with a sustainable network configuration suitable for carrying out the various steps, processes, methods, and operations described herein is discussed with respect to FIG. 1, any of a variety of systems and/or processes may be utilized in accordance with embodiments of the disclosure. For example, the device, controller, or logic may be a specialized device within the network or operated by a network administrator remotely from the deployed environment. In certain embodiments, the device, controller, or logic may be a logic that is operated or distributed through the access points of the network. The elements depicted in FIG. 1 may also be interchangeable with other elements of FIGS. 2-11 as required to realize a particularly desired embodiment.

Figure 2:
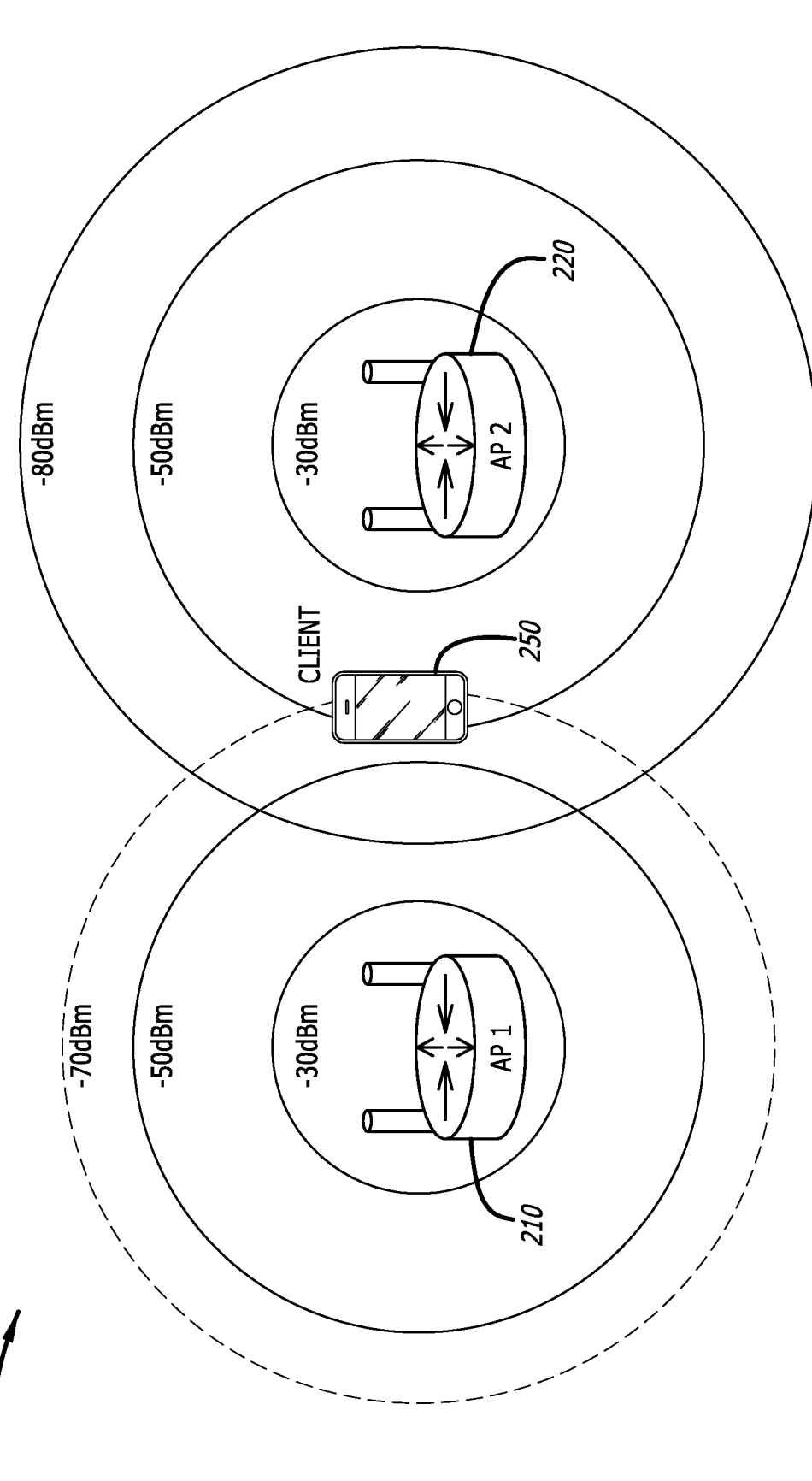
FIG. 2 is a conceptual illustration of constraining RSSI to force roaming across APs in accordance with various embodiments of the disclosure.

Referring to FIG. 2, a conceptual illustration of constraining RSSI to force roaming across APs in accordance with various embodiments of the disclosure is shown. As described herein, sticky clients tend to cling to a single AP even when their connection quality degrades, often leading to suboptimal performance for both the client and the network. Embodiments that implement a minimum RSSI threshold approach as described herein directly address this behavior by forcing clients to roam to a neighboring AP when their connection quality nears the threshold. This proactive roaming ensures that clients consistently connect to the best available AP, avoiding instances where they remain attached to a subpar connection. By nudging clients to explore alternative APs when signal strength deteriorates, the network enhances overall performance, reduces congestion, and creates a more balanced distribution of clients among APs. This not only improves the user experience but also optimizes network resources, thereby effectively mitigating the sticky client issue that can hamper network efficiency.

In many embodiments, constraining the minimum RSSI threshold for a client's association to an AP introduces a strategic mechanism that encourages proactive roaming behaviors within a wireless network. In this scenario, consider an exemplary case where client 250 is currently associated with AP1 210, with both AP1 and another neighboring AP2 220 exhibiting an RSSI level of substantially −30 dBm.

By establishing a minimum RSSI threshold, the network mandates that client 250's connection to AP1 210 must have an RSSI value surpassing a predefined threshold. This strategic maneuver compels the client to maintain a certain minimum signal strength while connected to AP1 210. However, the key outcome of this arrangement is to foster a situation where the client's connection quality begins to deteriorate due to its proximity to the defined minimum RSSI threshold. As the client's signal strength nears the threshold, the network employs a proactive roaming strategy, prompting the client to disassociate from AP1 210 and associate with the neighboring AP2 220.

Defining the optimal value for this minimum RSSI threshold is inherently complex and multifaceted. It hinges on several factors, including by way of non-limiting example, the topology of the neighboring APs, the specific types of clients being served, and the roaming patterns observed within the network. The effectiveness of this roaming strategy relies on a delicate balance between ensuring seamless client experiences and avoiding frequent unnecessary handoffs between APs. In the case where both AP1 and AP2 exhibit an RSSI of −30 dBm, the effectiveness of this threshold strategy might be somewhat limited due to their identical signal strengths.

It is important to note that the specific example of having an AP with an RSSI of −30 dBm serves is merely exemplary, and the threshold-based roaming solution is adaptable to a wide range of RSSI values. The effectiveness of this strategy does not rely on a particular RSSI level but rather on the relative difference between a client's current signal strength and the defined minimum RSSI threshold. Whether the AP's signal strength is at −30 dBm or any other value, the roaming mechanism functions based on how close the client's RSSI is to the set threshold. This flexibility allows the solution to be applied across diverse network scenarios, accommodating variations in AP strengths and other environmental factors while consistently fostering proactive client roaming behavior.

In many embodiments, optimal threshold determination may require a comprehensive analysis of the entire network's topology, client behaviors, and historical roaming patterns. These insights would guide the fine-tuning of the threshold to a value that triggers roaming at a point when client 250's connection quality degrades perceptibly while avoiding overzealous handoffs. To that end, it should be understood that AP.

Although a specific embodiment for a conceptual illustration of constraining RSSI to force roaming across APs is discussed with respect to FIG. 2, any of a variety of systems and/or processes may be utilized in accordance with embodiments of the disclosure. For example, the handoff of a client may be adjusted based on the type of client device or connection required. In this way, different devices may have different thresholds for being removed from a particular network device connection. The embodiment depicted in FIG. 2 is simplified for ease of understanding. The elements depicted in FIG. 2 may also be interchangeable with other elements of FIGS. 1 and 3-11 as required to realize a particularly desired embodiment.

Figure 3:
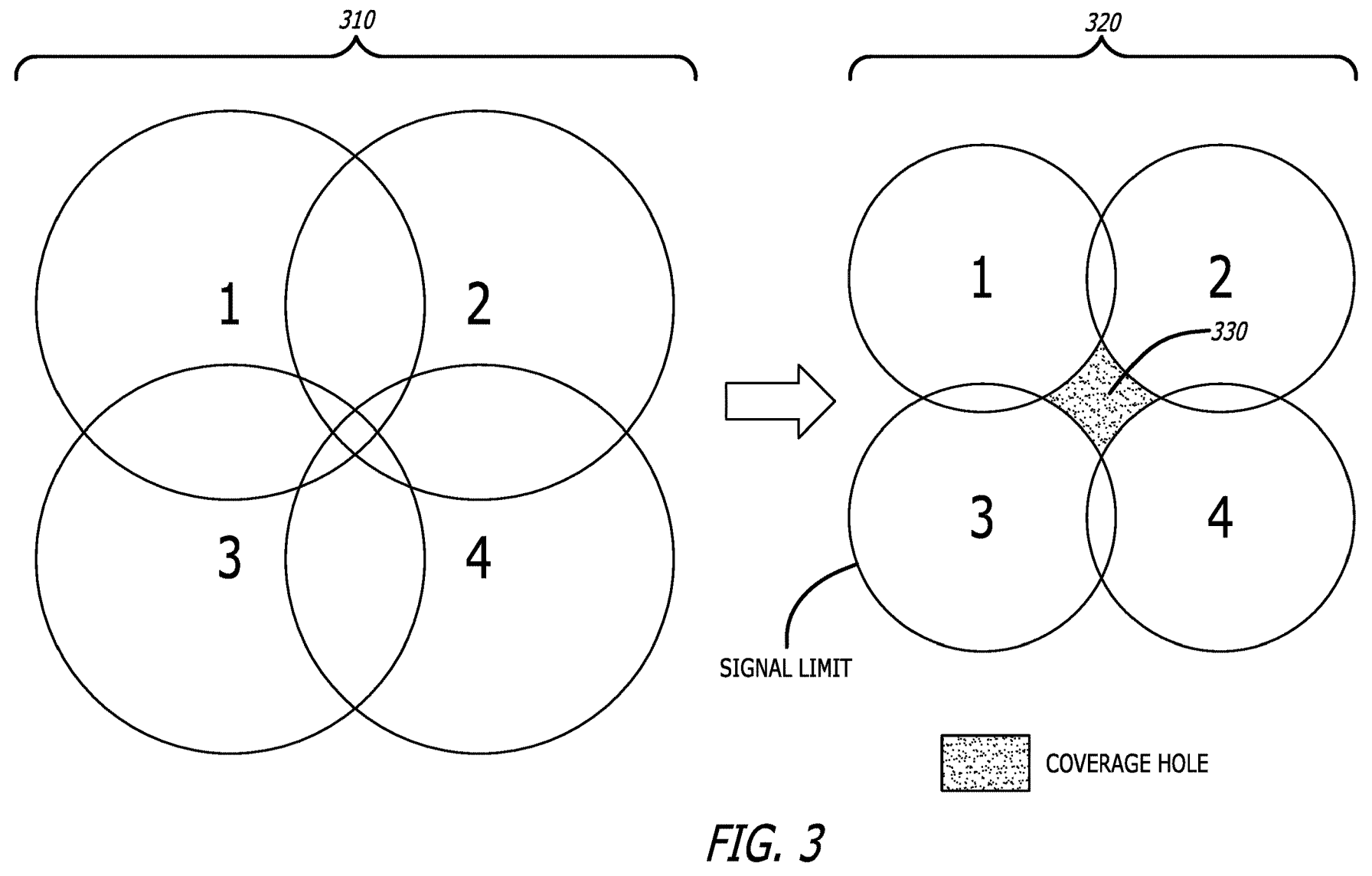

Referring to FIG. 3, a conceptual illustration of mitigating coverage holes in accordance with various embodiments of the disclosure is shown. Optimizing threshold settings in wireless networks presents a complex challenge due to the intricate trade-offs between different factors. The primary issue lies in finding the delicate balance between constraining lower data rates or RSSI thresholds to mitigate sticky clients and maintaining a sufficient coverage area. This balance becomes crucial to prevent coverage holes that can severely impact network performance and user experience.

For example, in a first coverage neighborhood 310, a series of four coverage regions (labeled as 1, 2, 3, and 4) are depicted. Each coverage region (1, 2, 3, 4) may be visualized as a circle, with the outer edge of the circle signifying a signal limit. For example, each circles may be analogized as ripples that expand from a stone dropped into a pond, where each ripple represents the range of the wireless signal transmitted by an AP. The outer perimeter edge of each circle represents the point at which the signal strength diminishes to a level where it becomes too weak for devices to reliably communicate with the AP. Within each coverage region, devices may connect to the AP and experience reliable communication as long as they are located within or near the circle. As devices move closer to the outer edge of the circle, the signal strength gradually weakens. Once a device crosses the outer edge, it enters a region commonly known as a coverage hole. In this area, the signal is too faint for the device to establish a stable connection, resulting in potential disruptions or complete lack of connectivity. In the first coverage neighborhood 310, these coverage regions are shown overlapping, without any apparent gaps. This signifies an optimal coverage configuration where clients can transition seamlessly between the different regions, maintaining a consistent connection without encountering coverage issues.

However, the complexity arises when considering a second coverage neighborhood 320. In this scenario, the same four coverage regions (1, 2, 3, and 4) are present, but they are not overlapping in the center. This non-overlapping arrangement results in a coverage hole 330 in the network. This coverage hole signifies an area where clients might experience poor or no connectivity due to the lack of overlapping coverage zones. Similarly, the coverage hole 330 may represent one or more areas or locations where the network's signal strength is weak or absent, leading to poor or no connectivity for devices within that region. Accordingly, devices in a coverage hole might struggle to connect to the network or experience unreliable connections, hampering their ability to access the internet, applications, or services. Coverage holes are undesirable because they result in a negative user experience and can disrupt essential tasks. They can lead to dropped calls, slow internet speeds, and interrupted connections, impacting productivity and communication. In a well-functioning wireless network, the goal is to provide consistent and reliable coverage across all areas to ensure seamless connectivity for all devices.

In many embodiments, optimizing the thresholds to prevent sticky clients while avoiding coverage holes requires a nuanced approach. Restricting lower data rates or RSSI thresholds might encourage clients to roam more actively, but it could also lead to decreased coverage as clients disconnect from APs too readily. On the other hand, relaxing these thresholds to maximize coverage might inadvertently foster sticky client behavior, where clients linger on a weak connection rather than seeking a stronger one. It is envisioned that in the pursuit of striking the right balance, network administrators will need to carefully consider the network topology, client distribution, and usage patterns. For example, the advantages of mitigating sticky clients must be weighed against the potential drawbacks of creating coverage holes. By leveraging tools such as historical telemetry data and network simulations, administrators can explore threshold configurations that optimize both client roaming behaviors and network coverage, ensuring a seamless user experience while maintaining robust and reliable connectivity, as described herein.

Although a specific embodiment for a conceptual illustration of mitigating coverage holes is discussed with respect to FIG. 3, any of a variety of systems and/or processes may be utilized in accordance with embodiments of the disclosure. For example, the actual coverage holes may be more complex based on environmental challenges or other barriers that prevent perfect circular transmission areas. The embodiment depicted in FIG. 3 is simplified for ease of understanding. The elements depicted in FIG. 3 may also be interchangeable with other elements of FIGS. 1-2 and 4-11 as required to realize a particularly desired embodiment.

Figure 4:
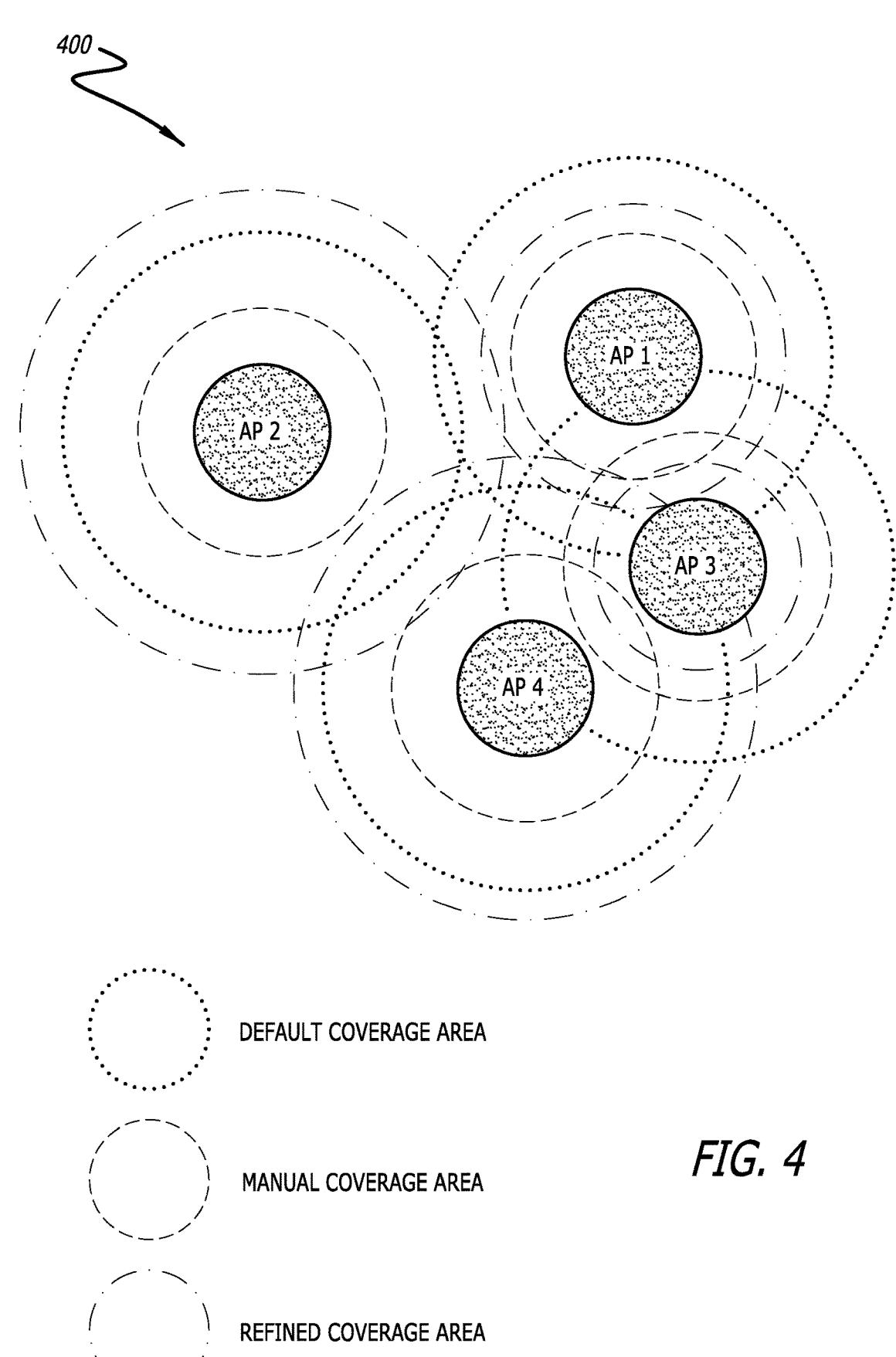
FIG. 4 is a conceptual illustration of various coverage areas in accordance with various embodiments of the disclosure.

Referring to FIG. 4, a conceptual illustration of various coverage areas in accordance with various embodiments of the disclosure is shown. In many embodiments, visualizing the coverage areas of four distinct Access Points (APs)—AP 1, AP 2, AP 3, and AP 4—provides a comprehensive view of how network 400's connectivity may extend across various settings. Three regions of coverage are showcased, by way of non-limiting example: default coverage area 410, manually adjusted coverage area 420, and refined coverage area 430.

In many embodiments, the default coverage area 410 depicts a typical range within which one or more devices can connect to each AP. This range is determined by factors such as signal strength and potential obstacles. However, this default coverage might not be perfectly aligned with the network's intended coverage and user requirements.

To that end, in many embodiments the manual coverage area 420 may represent a step towards optimizing coverage. Network administrators can manually adjust the coverage area of each AP based on their expertise and specific needs. This manual adjustment involves configuring the AP's settings to fine-tune the signal strength and reach, aligning it more closely with the actual physical layout and requirements of the environment. This approach ensures that the coverage area better matches the intended network deployment.

In many embodiments, the refined coverage area 430 introduces a dynamic element, recognizing that different APs might require tailored coverage areas. This adjustment considers the specific location and context of each AP. For example, an AP placed in a densely populated area might benefit from a more focused coverage area to avoid interference, while an AP in an open space could extend its range for broader coverage. By varying the refined coverage for each AP, the network optimally caters to the unique demands of different locations, user densities, and potential obstacles.

This adaptability underscores the importance of understanding the physical environment in which APs are deployed. By accounting for factors like building layouts, walls, obstacles, and device densities, administrators can ensure that each AP's refined coverage area aligns with the environment's nuances. This dynamic refinement enables the network to provide consistent and reliable connectivity while minimizing interference and coverage gaps.

It should be understood that expanding or reducing coverage area based on distinct AP characteristics and environmental factors introduces a crucial dimension in optimizing wireless networks. For example, a default coverage area 410 might not be universally applicable to all APs due to the unique layout, building materials, and usage patterns within a given environment. Consider a scenario where an AP's default coverage area 410 extends too far, potentially causing unnecessary interference in densely populated areas. Here, the goal would be to curtail this overreach. By manually adjusting the AP's coverage settings or applying a refined coverage area 430, administrators can effectively restrict the signal range to prevent signal overlap and ensure a higher quality connection experience for users.

Conversely, another AP might face the challenge of insufficient coverage, where the default coverage area 410 falls short of providing seamless connectivity to devices in certain areas. In this case, both manual and refined coverage adjustments come into play as potential solutions. By expanding the coverage area, administrators can address coverage gaps and ensure uninterrupted connectivity for devices that would otherwise struggle to maintain a stable connection. The decision to expand or reduce coverage is influenced by a range of aspects. These may include the physical layout of the environment, the density of devices in a specific area, the presence of obstacles such as walls and structures, and even the type of devices commonly used in the vicinity. For instance, in a large auditorium where numerous devices are concentrated, coverage might need to be expanded. Conversely, in a quiet office space where interference is a concern, coverage could be purposefully reduced to enhance signal quality.

Although a specific embodiment for a conceptual illustration of various coverage areas is discussed with respect to FIG. 4, any of a variety of systems and/or processes may be utilized in accordance with embodiments of the disclosure. For example, the shapes of the coverage areas may not be circular and can vary depending on various factors such as, but not limited to, the barriers, obstacles, or other environmental changes within the deployment. The elements depicted in FIG. 4 may also be interchangeable with other elements of FIGS. 1-3 and 5-11 as required to realize a particularly desired embodiment.

Figure 5:
FIG. 5 is a conceptual illustration of a neural network in accordance with various embodiments of the disclosure.
Figure 5:
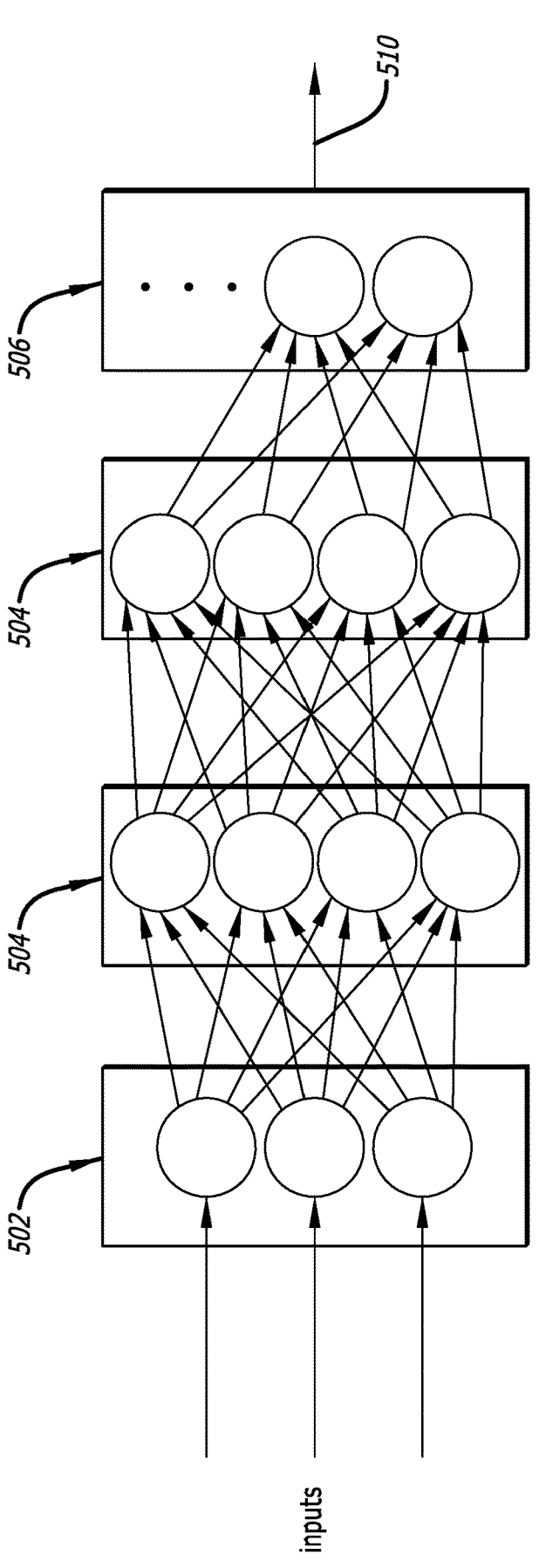

Referring to FIG. 5, is a conceptual illustration of a neural network in accordance with an embodiment of the disclosure is shown. At a high level, the neural network 500 comprises an input layer 502, two or more hidden layers 504, and an output layer 506. The neural network 500 comprises a collection of connected units or nodes called artificial neurons which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the neural network depicted in FIG. 5 is shown as an illustrative example and various embodiments may comprise neural networks that can accept more than one type of input and can provide more than one type of output.

In a typical embodiment, the signal at a connection between artificial neurons is a real number, and the output of each artificial neuron is computed by some non-linear function (called an activation function) of the sum of the artificial neuron's inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 502) to the last layer (the output layer 506), possibly after traversing one or more intermediate layers, called hidden layers 504.

The inputs to a neural network may vary depending on the problem being addressed. In object detection, the inputs may be data representing pixel values for certain pixels within an image or frame. In one embodiment the neural network 500 comprises a series of hidden layers in which each neuron is fully connected to neurons of the next layer. The neural network 500 may utilize an activation function such as sigmoid or a rectified linear unit (ReLU), for example. The last layer in the neural network may implement a regression function such as SoftMax regression to produce the classified or predicted classifications for object detection as output 510. In further embodiments a sigmoid function can be used, and position prediction may need raw output transformation into linear and/or non-linear coordinates.

In certain embodiments, the neural network 500 is trained prior to deployment and to conserve operational resources. However, some embodiments may utilize ongoing training of the neural network 500 especially when operational resource constraints such as die area and performance are less critical. As will be discussed in more detail below, the neural networks in many embodiments will process video frames through a series of downsamplings (e.g., convolutions, pooling, etc.) and upsamplings (i.e., expansions) to generate an inference map similar to the inference map image in the embodiment depicted in FIG. 1.

Although a specific embodiment for a conceptual illustration of a neural network is discussed with respect to FIG. 5, any of a variety of systems and/or processes may be utilized in accordance with embodiments of the disclosure. For example, more complex neural networks may be utilized. Furthermore, additional structures can be configured such that the specific neural layout depicted in the embodiment of FIG. 5 is not representative of the relationship or mathematical layout of the network. The elements depicted in FIG. 5 may also be interchangeable with other elements of FIGS. 1-4 and 6-11 as required to realize a particularly desired embodiment.

Figure 6:
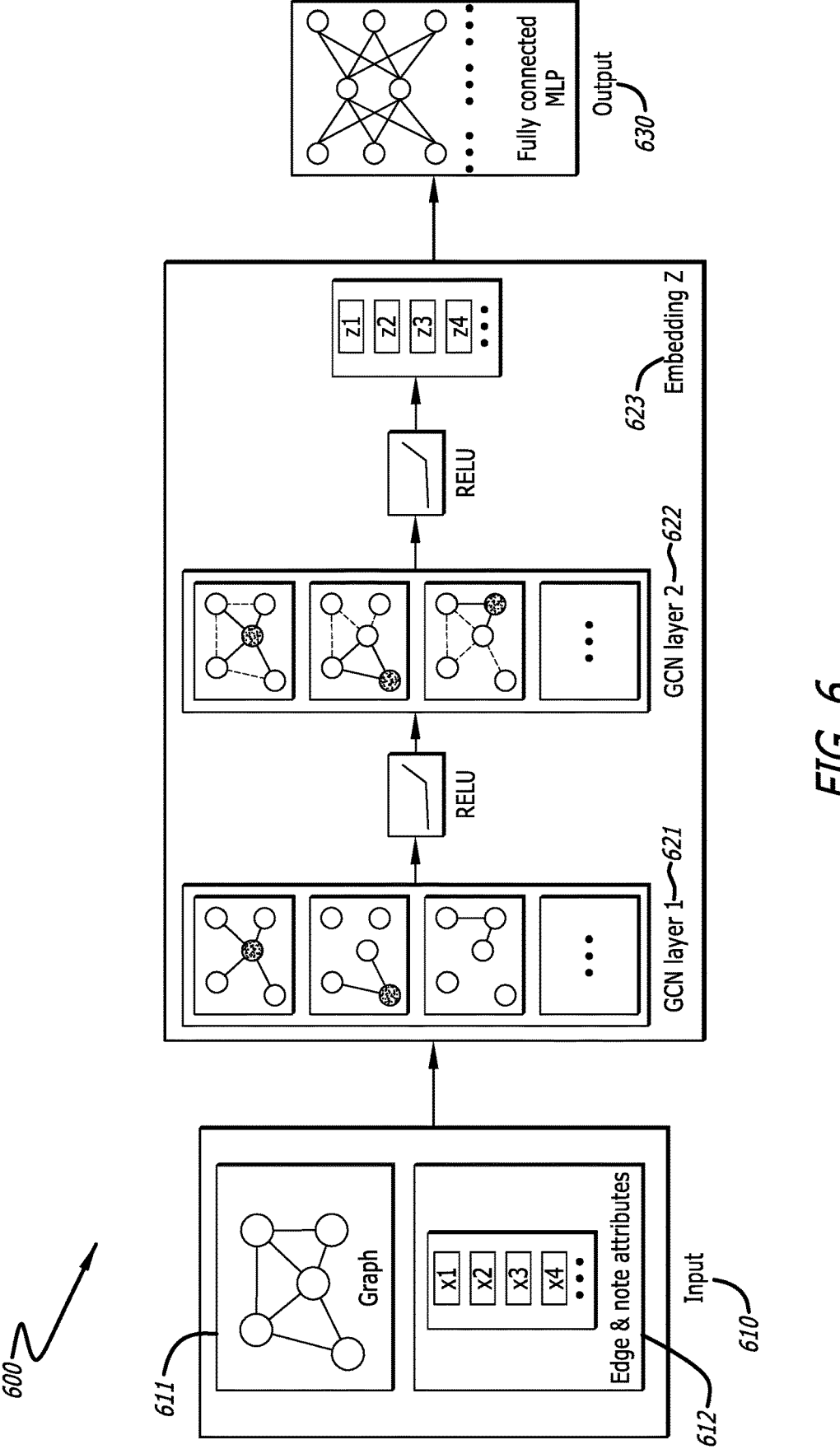
FIG. 6 is a conceptual illustration of a deep learning graph neural network in accordance with various embodiments of the disclosure.

Referring to FIG. 6, a conceptual illustration of a deep learning graph neural network in accordance with various embodiments of the disclosure is shown. In many embodiments, the GNN 600 may be leveraged as a machine learning process to address the challenge of sticky clients as described herein. In more embodiments, the GNN 600 includes a graph 611 that features various nodes and edges, where nodes may represent entities and edges may represent relationships between these entities. Each node and edge in the graph may be associated with one or more attributes. These attributes could be features, labels, or any relevant information about the nodes and edges. These attributes are represented as the input data 610 to the GNN. In some embodiments, a wireless network may be represented as a graph, where nodes correspond to APs and edges represent signal strength or proximity between APs. The input attributes could include information about the load on each AP, signal strength, and historical data on client movements.

In more embodiments, the input data 610 includes both node and edge attributes 612, which may be input into an embedding layer (Z element 623). This embedding layer may be configured to be responsible for transforming the input attributes into a more suitable format for the subsequent layers to process. One common choice of embedding is the Graph Convolutional Network (GCN) layer. In various embodiments, the GNN 600's initial embedding layer (Z element 623) could transform these attributes into a suitable format for analysis. For example, the first GCN layer (GCN layer 1, 621) could process the embedded data, by considering the relationships between APs and their attributes. In many embodiments, the first GCN layer (GCN layer 1, 621) could utilize the embedded input data and performs a convolution-like operation on the graph structure. This layer aggregates information from neighboring nodes and edges to update the features of each node. The output of this layer may then be communicated through a Rectified Linear Unit (ReLU) activation function. ReLU introduces non-linearity to the network by replacing negative values with zero, helping the network learn complex relationships in the data.

The ReLU activation function applied afterward would introduce non-linearity, capturing complex patterns in the graph. The second GCN layer (GCN layer 2, 622) would build on the insights gained from the first layer, potentially capturing more nuanced relationships between APs. It is envisioned that the output of the first GCN layer may be fed into another GCN layer (GCN layer 2, 622), which performs a similar aggregation and feature update operation. Again, a ReLU activation function follows to introduce non-linearity. The second GCN layer can capture higher-order relationships and patterns within the graph, building on the features learned in the previous layer.

In many embodiments, the output of the second GCN layer serves as the learned representation of the graph after multiple layers of processing. This representation is then passed through a fully connected Multi-Layer Perceptron (MLP) to generate the final predictions or outputs. The MLP is a standard neural network architecture consisting of multiple layers of interconnected nodes that apply linear transformations followed by activation functions. It should be understood that the ReLU activation following this layer further refines the learned features. The output of the GNN 600 would then be fed into a fully connected MLP (Layer 630), which could be designed to predict the likelihood of a sticky client scenario for each client-AP pair. This prediction could be based on factors such as the load distribution, signal quality, and mobility history of the client.

During the deployment of the GNN 600, it could be trained using historical data that includes instances of sticky clients and instances where clients successfully switch to better APs. The GNN learns to recognize the underlying patterns and relationships that lead to sticky client behavior. Once trained, it is envisioned that the GNN 600 can be used in real-time to predict the potential for sticky clients. When a sticky client situation is identified, the network management system could intervene by sending proactive notifications to the affected clients, suggesting a switch to a less congested or stronger AP. Alternatively, the network itself could automatically initiate actions to guide clients to more suitable APs, thus alleviating sticky client issues and improving overall network performance. In this way, the GNN 600 serves as a data-driven solution to mitigate sticky clients by leveraging the power of graph-based representation and learning to model the complex interactions between wireless access points and client devices.

Although a specific embodiment for a conceptual illustration of a deep learning graph neural network is discussed with respect to FIG. 6, any of a variety of systems and/or processes may be utilized in accordance with embodiments of the disclosure. For example, it is contemplated that other variations on these neural network embodiments can be utilized as they become available and/or the processing power within the network device becomes sufficient to incorporate them in a way suitable for deployment. The elements depicted in FIG. 6 may also be interchangeable with other elements of FIGS. 1-5 and 7-11 as required to realize a particularly desired embodiment.

Figure 7:
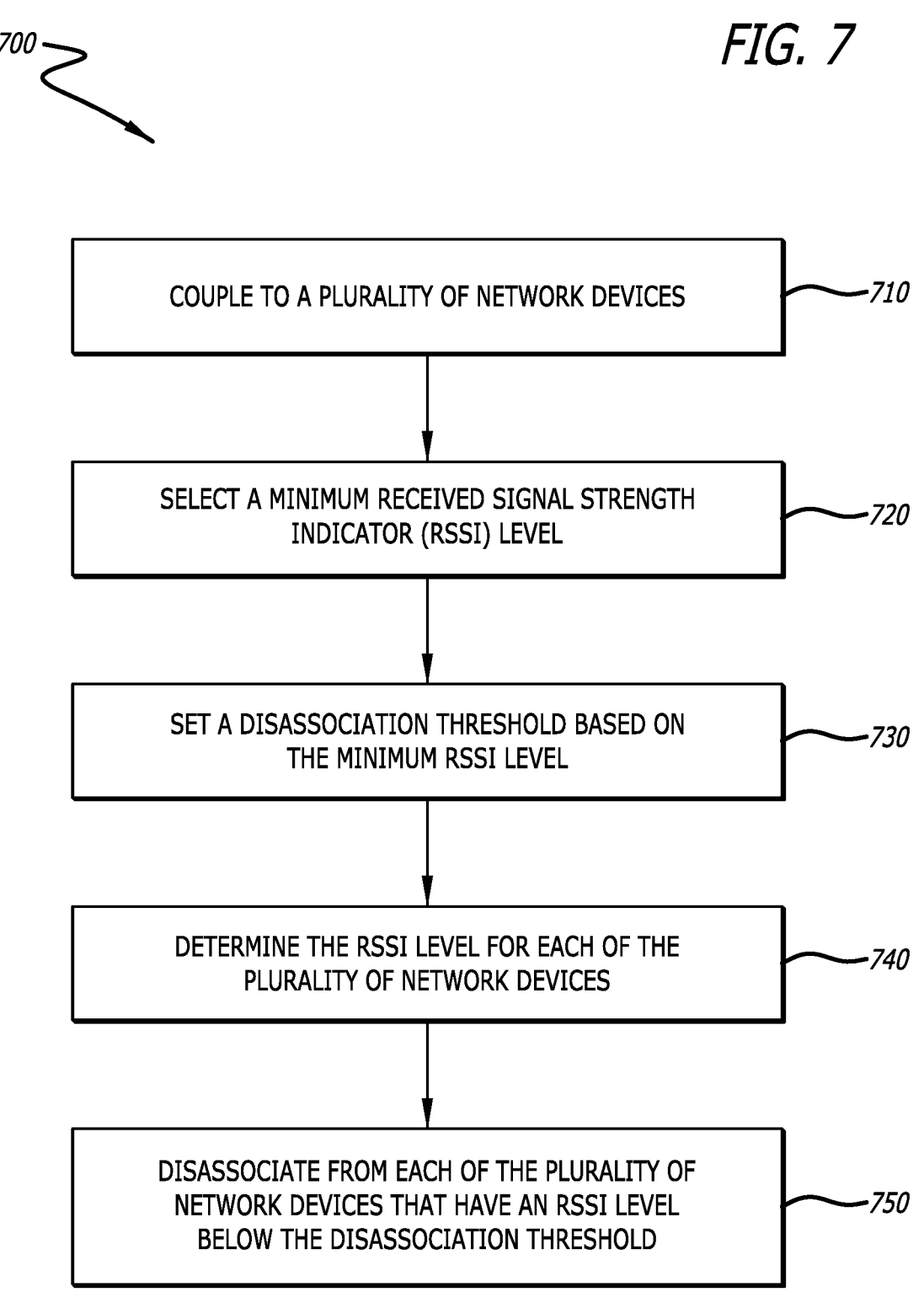
FIG. 7 is a flowchart depicting a process for disassociating from network devices that have an RSSI level below a disassociation threshold in accordance with various embodiments of the disclosure.

Referring to FIG. 7, a flowchart depicting a process for disassociating from network devices that have an RSSI level below a disassociation threshold in accordance with various embodiments of the disclosure is shown. In many embodiments, the process 700 can begin by coupling to a plurality of network devices (block 710). In certain embodiments, a connection is established between an AP and multiple devices within a network environment. In the context of APs and roaming, this step is crucial for seamless connectivity as users move from one area to another. When a user roams, their device needs to seamlessly transition from one AP to another without interruption. Coupling may involve the AP, for example, identifying nearby devices, negotiating the connection parameters, and allowing devices to switch from one access point to another while maintaining consistent network services. This ensures that users can maintain their network connection and experience uninterrupted data transfer, even as they move around within a network coverage area.

In more embodiments, a minimum RSSI level is selected (block 720). For example, by setting a minimum RSSI level, the network can be configured to ensure that a device maintains a certain level of signal quality while connected to an AP. If the signal strength drops below this threshold, the device may proactively search for a stronger access point to maintain a reliable connection. This helps in preventing devices from holding onto weak or unstable connections, ultimately leading to better performance and smoother roaming experiences for users within the network. In additional embodiments, messages sent from network devices with an RSSI (Received Signal Strength Indicator) level below the minimum RSSI level may be ignored, which may entail disregarding communication signals originating from various devices within the network if their signal strength falls below a predetermined threshold. This action may ensure that only messages with sufficiently strong signal qualities are considered, improving overall communication reliability, and minimizing potential data noise or interference from weaker signals.

In still additional embodiments, a disassociation threshold is set based on the minimum RSSI level (block 730). The disassociation threshold may represent a point at which a device's signal strength becomes too weak to maintain a reliable connection with an access point. This threshold may be directly tied to the minimum RSSI level that has been defined for the network. When a device's signal strength falls below this disassociation threshold, it triggers the device to disconnect from the current access point and search for a stronger one. By aligning the disassociation threshold with the minimum RSSI level, the network ensures that devices transition to a new access point before the signal quality deteriorates to a point where connectivity issues might arise, thereby enhancing the overall roaming performance and user experience.

In some embodiments, disassociating involves sending a de-authentication message to each of the multiple network devices that possess an RSSI level lower than the predefined minimum. This de-authentication message informs these devices that they are no longer connected to the network, prompting them to disconnect. This helps maintain network efficiency by removing devices with weaker signal strengths that might disrupt communication quality, thereby enhancing overall network performance.

In additional embodiments, an RSSI level for each of the plurality of network devices is determined (block 740). To facilitate seamless roaming, the network may be configured to evaluate the RSSI of each device in relation to its connected AP. By assessing the signal quality for each device, the network may establish a baseline RSSI level that signifies optimal connectivity. This personalized RSSI level is specific to each device and helps determine when a device should consider switching to a different access point as it moves within the network coverage area. This tailored approach ensures that devices maintain strong connections and roam efficiently, adapting to changing signal strengths and enhancing the overall user experience.

In many embodiments, the process may include disassociating from each of the plurality of network devices that have an RSSI level below the disassociation threshold (block 750). It should be understood that this threshold may be configured to indicate a minimum acceptable signal strength for maintaining a stable connection. If the RSSI level of a specific device drops below this threshold, the network initiates a disassociation process. In such cases, the device is detached from its current access point and is prompted to search for a more robust connection with a different access point. By systematically disassociating devices with weak signal strengths, the network guarantees that devices sustain reliable connectivity and promptly switch to stronger access points, thereby ensuring uninterrupted data flow and an enhanced roaming experience for users.

Although a specific embodiment for a flowchart depicting a process for disassociating from network devices that have an RSSI level below a disassociation threshold is discussed with respect to FIG. 7, any of a variety of systems and/or processes may be utilized in accordance with embodiments of the disclosure. For example, although the embodiments described herein are directed to an RSSI level, it is contemplated that any signal strength indication may be utilized to achieve similar results as desired. The elements depicted in FIG. 7 may also be interchangeable with other elements of FIGS. 1-6 and 8-11 as required to realize a particularly desired embodiment.

Figure 8:
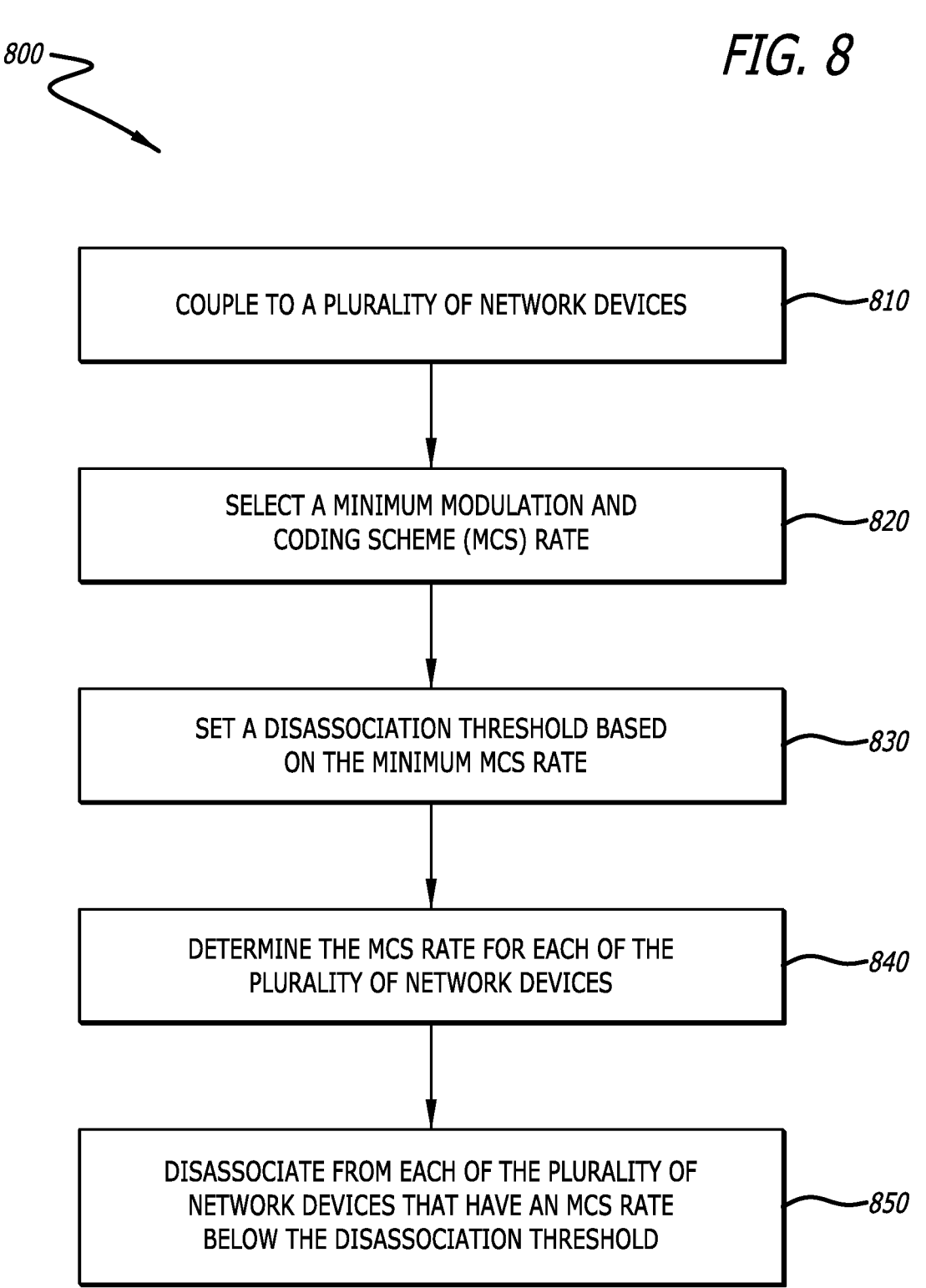
FIG. 8 is a flowchart depicting a process for disassociating from network devices that have an MCS rate below a disassociation threshold in accordance with various embodiments of the disclosure.

Referring to FIG. 8, a flowchart depicting a process 800 for disassociating from network devices that have a Modulation and Coding Scheme (MCS) rate below a disassociation threshold in accordance with various embodiments of the disclosure is shown. In many embodiments, the process 800 can begin by coupling to a plurality of network devices (block 810). In certain embodiments, a connection is established between an AP and multiple devices within a network environment. In the context of APs and roaming, this step is crucial for seamless connectivity as users move from one area to another. When a user roams, their device needs to seamlessly transition from one AP to another without interruption. Coupling may involve the AP, for example, identifying nearby devices, negotiating the connection parameters, and allowing devices to switch from one access point to another while maintaining consistent network services. This ensures that users can maintain their network connection and experience uninterrupted data transfer, even as they move around within a network coverage area.

In many embodiments, a selection of a minimum MCS rate pertains to one or more techniques that encode and modulate data signals for wireless transmission (block 820). By designating a minimum MCS rate, the network establishes a baseline data transmission rate required for a stable connection. A minimum rate may be selected to ensure that devices maintain a certain level of performance and signal quality during communication. If a device's signal strength weakens due to roaming or other factors, the network can adjust the MCS rate accordingly.

In many embodiments, the disassociation threshold represents a point at which a device's data transmission rate drops below an acceptable level, indicating potential signal degradation (block 830). This threshold is intricately tied to the minimum MCS rate predetermined for the network. When a device's data rate falls below this disassociation threshold, it triggers the device to consider switching to a stronger access point. By aligning the disassociation threshold with the minimum MCS rate, the network ensures that devices proactively transition to more suitable access points before the data transmission rate deteriorates further. This approach may desirably safeguard efficient data transfer and a seamless roaming experience, contributing to enhanced connectivity for users within the network.

In additional embodiments, the process 800 involves determining a specific MCS rate for each network device (block 840). It is envisioned that to optimize performance, the network evaluates factors such as signal strength, interference, and device capabilities for each individual device. Based on this assessment, a tailored MCS rate is assigned to each device. This personalized rate ensures that devices operate at their optimal data transmission efficiency, adapting to varying conditions as the devices move within the network coverage area. By assigning distinct MCS rates, the network may enhance data transfer reliability and overall user experience, contributing to seamless roaming and uninterrupted connectivity.

In still additional embodiments, in response to a device's MCS rate falling below a disassociation threshold due to factors like signal degradation or interference, the network initiates a disassociation process (block 850). During disassociation, the device may be detached from its current AP and encouraged to search for an AP offering a higher MCS rate. This disassociation can be carried out by ignoring signals or refusing to send data back to the device.

Although a specific embodiment for a flowchart depicting a process for disassociating from network devices that have a Modulation and Coding Scheme (MCS) rate below a disassociation threshold is discussed with respect to FIG. 8, any of a variety of systems and/or processes may be utilized in accordance with embodiments of the disclosure. For example, the disassociation rate can be correlated to or otherwise associated with the RSSI level in certain embodiments. The elements depicted in FIG. 8 may also be interchangeable with other elements of FIGS. 1-7 and 9-11 as required to realize a particularly desired embodiment.

Figure 9:
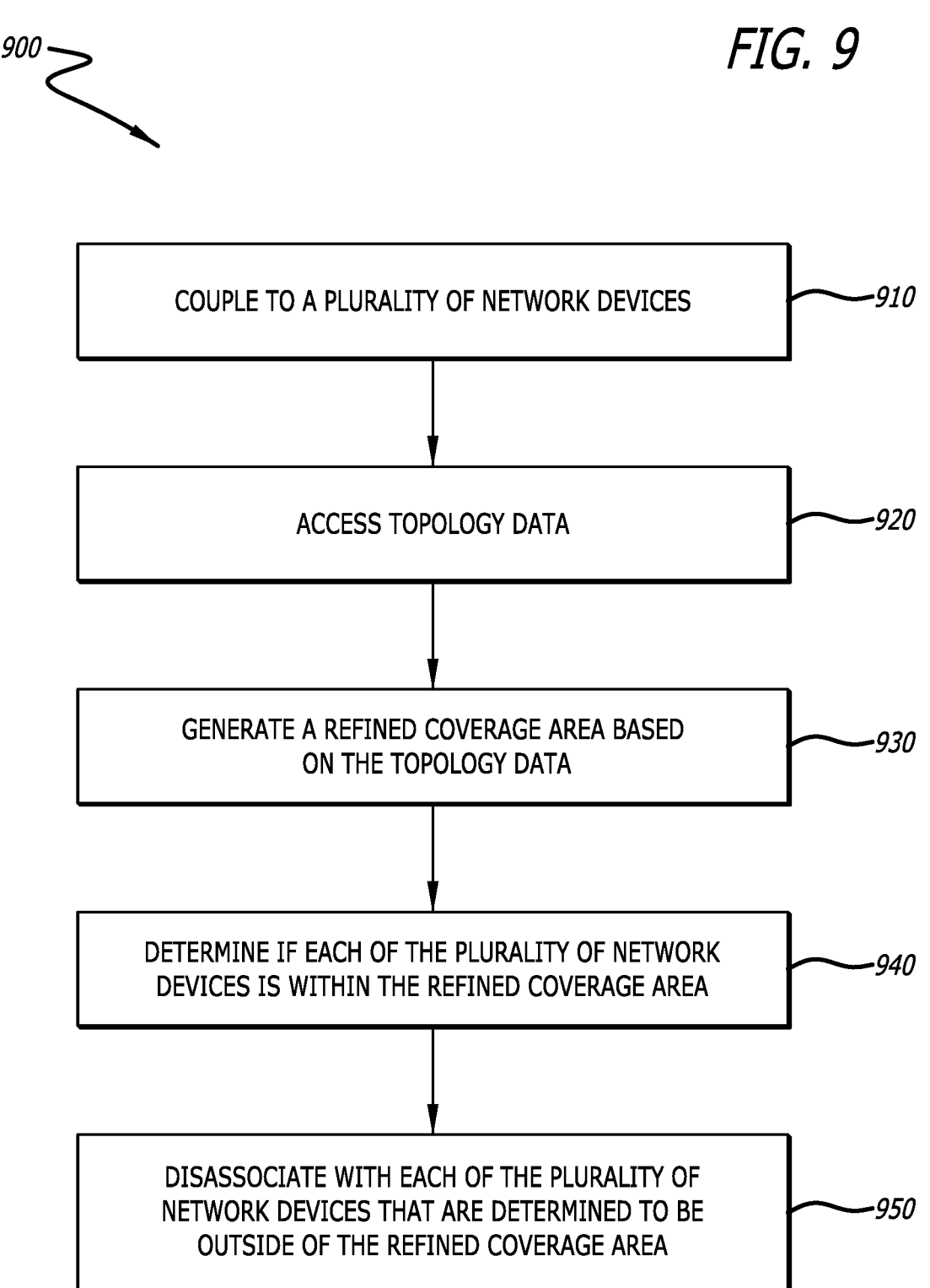
FIG. 9 is a flowchart depicting a process for disassociating from network devices that are determined to be outside of a refined coverage area in accordance with various embodiments of the disclosure.

Referring to FIG. 9, a flowchart depicting a process for disassociating from network devices that are determined to be outside of a refined coverage area in accordance with various embodiments of the disclosure is shown. In many embodiments, the process 900 can begin by coupling to a plurality of network devices (block 910). In certain embodiments, a connection is established between an AP and multiple devices within a network environment. In the context of APs and roaming, this step is crucial for seamless connectivity as users move from one area to another. When a user roams, their device needs to seamlessly transition from one AP to another without interruption. Coupling may involve the AP, for example, identifying nearby devices, negotiating the connection parameters, and allowing devices to switch from one access point to another while maintaining consistent network services. This ensures that users can maintain their network connection and experience uninterrupted data transfer, even as they move around within a network coverage area.

In many embodiments, topology data is accessed to retrieve information regarding the structure and layout of a network's interconnected components (block 920). This data may provide a comprehensive understanding of how devices, access points, and other network elements are linked together. It is envisioned that the topology data includes any of various details, such as the relationships between devices, the physical and logical connections between network nodes, and the overall arrangement of the network architecture. By accessing topology data, network administrators and management systems can gain insights into the network's organization, identify potential bottlenecks or vulnerabilities, and make informed decisions to optimize performance, enhance security, and ensure the efficient functioning of the network.

In additional embodiments, a refined coverage area is generated based on the accessed topology data, so as to delineate the extent of network signal reach and connectivity (block 930). The refined coverage area may take into account spatial relationships and connectivity patterns of network devices and APs, for example. By analyzing the topology data, the network management system can determine signal propagation characteristics, potential dead zones, and areas with overlapping coverage. With this information, the system can adjust access point placements, optimize signal strength, and ensure seamless roaming experiences for devices within the network. The generation of a refined coverage area helps in creating an efficient and reliable network environment by aligning signal distribution with the network's physical layout and connectivity requirements.

In still additional embodiments, the process 900 may be include determining if one or more network devices are within the refined coverage area (block 940). This may be conducted by checking signal strength between devices and APs using a signal strength indicator. In addition, and/or in the alternative, the device's location information, such as GPS or IP addresses, may be used to compare with the coverage area. In many embodiments, unique signal patterns may be mapped in different areas to match devices to their approximate location. It should be understood that trilateration may also be used to estimate a device's position based on distances from multiple APs. In some embodiments, a mix of these methods may be utilized to determine if devices are within the refined coverage area, for example.

In many embodiments, disassociation may occur in response to determining that the plurality of network devices is outside of the refined coverage area (block 950). For example, when one or more devices move outside the refined coverage area, their signal strength and quality may decline, leading to potential connectivity issues. To address this, the network initiates disassociation, so as to disconnect these devices from their current APs. This prompts the devices to seek out stronger APs within the refined coverage area, ensuring optimal signal strength and uninterrupted connectivity. By proactively disassociating devices outside the refined coverage area, the network maintains a high-quality user experience, preventing instances of weak or unstable connections as devices move within the network environment.

Although a specific embodiment for a process for disassociating from network devices that are determined to be outside of a refined coverage area is discussed with respect to FIG. 9, any of a variety of systems and/or processes may be utilized in accordance with embodiments of the disclosure. For example, the devices described herein may be an access point, but are contemplated to be any network device as suitable to carry out the processes described herein. The elements depicted in FIG. 9 may also be interchangeable with other elements of FIGS. 1-8 and 10-11 as required to realize a particularly desired embodiment.

Figure 10:
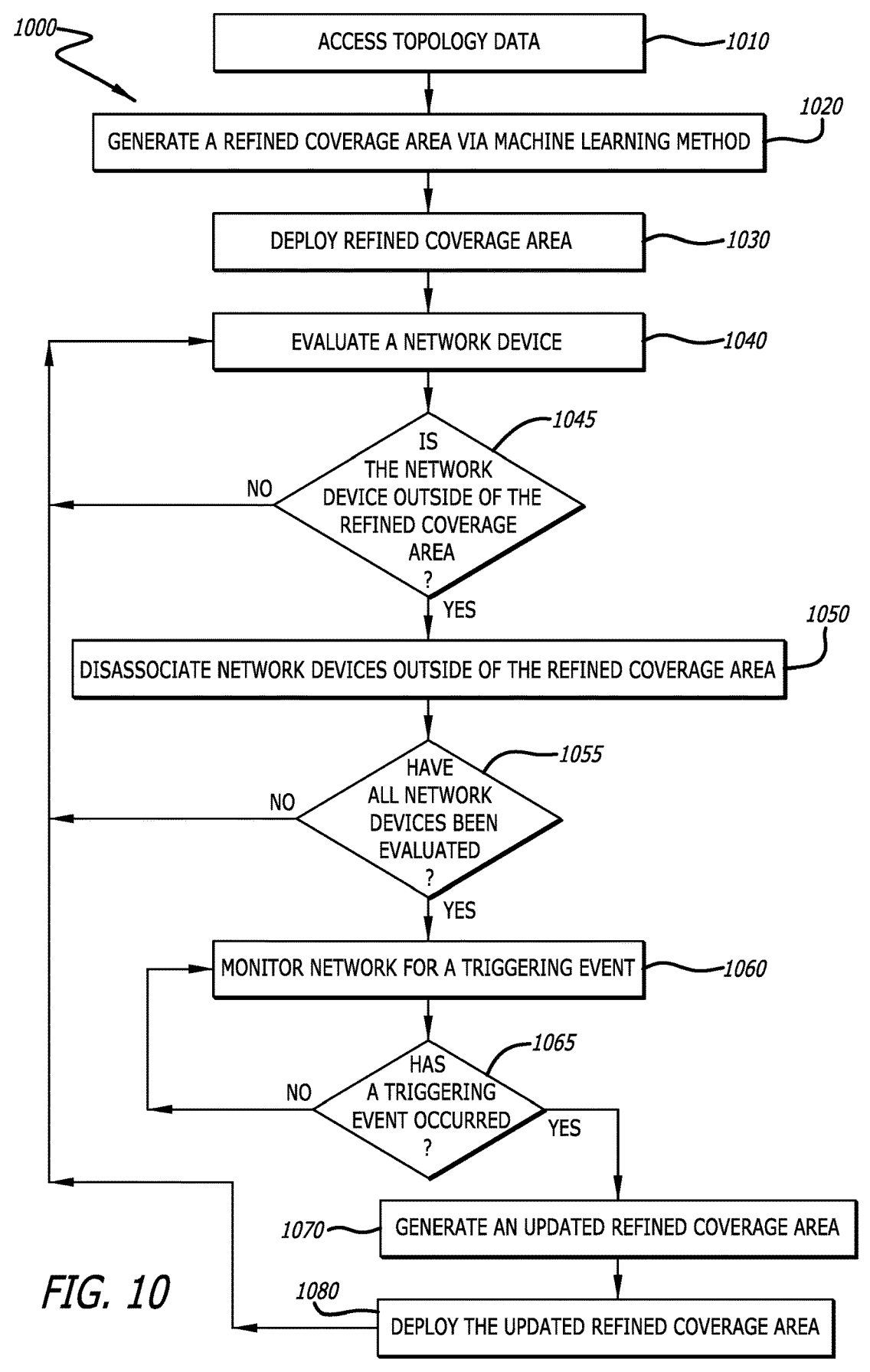

Referring to FIG. 10, a flowchart depicting a process 1000 for generating a refined coverage area using machine learning in accordance with various embodiments of the disclosure is shown. In many embodiments, topology data may be accessed (block 1010). This data may provide a comprehensive understanding of how devices, access points, and other network elements are linked together. It is envisioned that the topology data includes any of various details, such as the relationships between devices, the physical and logical connections between network nodes, and the overall arrangement of the network architecture. By accessing topology data, network administrators and management systems can gain insights into the network's organization, identify potential bottlenecks or vulnerabilities, and make informed decisions to optimize performance, enhance security, and ensure the efficient functioning of the network.

In additional embodiments, a refined coverage area may be generated using a machine learning method by leveraging historical data and predictive algorithms (block 1020). Initially, a system or device may be configured to collect data on signal strength, device locations, and network topology over time. Machine learning algorithms, such as clustering or regression models, may be trained on this data to recognize patterns and relationships between signal strength and device locations. Once trained, the algorithm may be configured or otherwise programmed to predict signal propagation characteristics based on new data points. By inputting the positions of APs and other environmental factors, for example, the algorithm can generate a predictive map of signal coverage. This map can dynamically adjust as new data is collected, continuously refining the coverage area. By utilizing machine learning, the refined coverage area becomes more accurate and adaptable to changing network conditions, ultimately enhancing the precision of signal distribution, and optimizing roaming experiences for network devices.

In still additional embodiments, a refined coverage area may be deployed (block 1030). For example, deploying a refined coverage area may include implementing the insights gained from signal strength analysis and network data. It is envisioned that the collected data may be used to process and identify signal propagation patterns and optimal coverage boundaries. Using this information, network administrators may strategically position APs, by considering factors such as signal overlap and potential dead zones. APs may be configured to adjust their signal strength based on real-time data, ensuring a seamless transition of devices between coverage areas. Continuous monitoring of signal quality and device movement allows for dynamic adjustments to the coverage area. This iterative process of data analysis, AP placement, and signal tuning creates a refined coverage area that adapts to the network's evolving needs, providing robust and reliable connectivity for network devices as they roam within the network environment.

In many embodiments a network device can be evaluated (block 1040). This may involve analyzing various aspects such as the device's signal strength, data transmission capabilities, connectivity stability, and adherence to network protocols. Evaluating a network device also may include checking for any potential issues, such as signal interference, security vulnerabilities, or hardware/software limitations that might impact its effectiveness within the network. In various embodiments, evaluations may comprise determining one or more signal strengths.

In some embodiments, a determination can be made if the network device is outside of the refined coverage area (block 1045). If the result of this inquiry is "yes", then network devices of the of the refined coverage area are disassociated (block 1050). If the result of this inquiry is "no", then the process 1000 returns to block 1040. In additional embodiments, a determination is made if all network devices have been evaluated (block 1055). If the result of this inquiry is "yes", then the network is monitored for a triggering event (block 1060). As those skilled in the art will recognize, a triggering event can include a variety of different things such as, but not limited to, a change in network topology, a change in network telemetry, the determination of movement of one or more devices, the determination of an error with one or more devices, etc.

In additional embodiments, a determination can be made if a triggering event has occurred (block 1065). If the result of this inquiry is "yes", then an updated refined coverage area may be generated (block 1070). In some embodiments, the refined coverage area can be configured as a different size. In more embodiments, the refined coverage area can be changed by adding or removing devices to the coverage area. In still additional embodiments, the updated refined coverage area is deployed (block 1080). In many embodiments, the process 1000 may return to block 1040 for network device evaluation.

Although a specific embodiment for a flowchart depicting a process 1000 for generating a refined coverage area using machine learning is discussed with respect to FIG. 10, any of a variety of systems and/or processes may be utilized in accordance with embodiments of the disclosure. For example, the telemetry and topology data can be comprised of a variety of different data types that can indicate changes in the devices connected to the network, or the data speed or conditions of data transmission over the network. The elements depicted in FIG. 10 may also be interchangeable with other elements of FIGS. 1-9 and 11 as required to realize a particularly desired embodiment.

Figure 11:
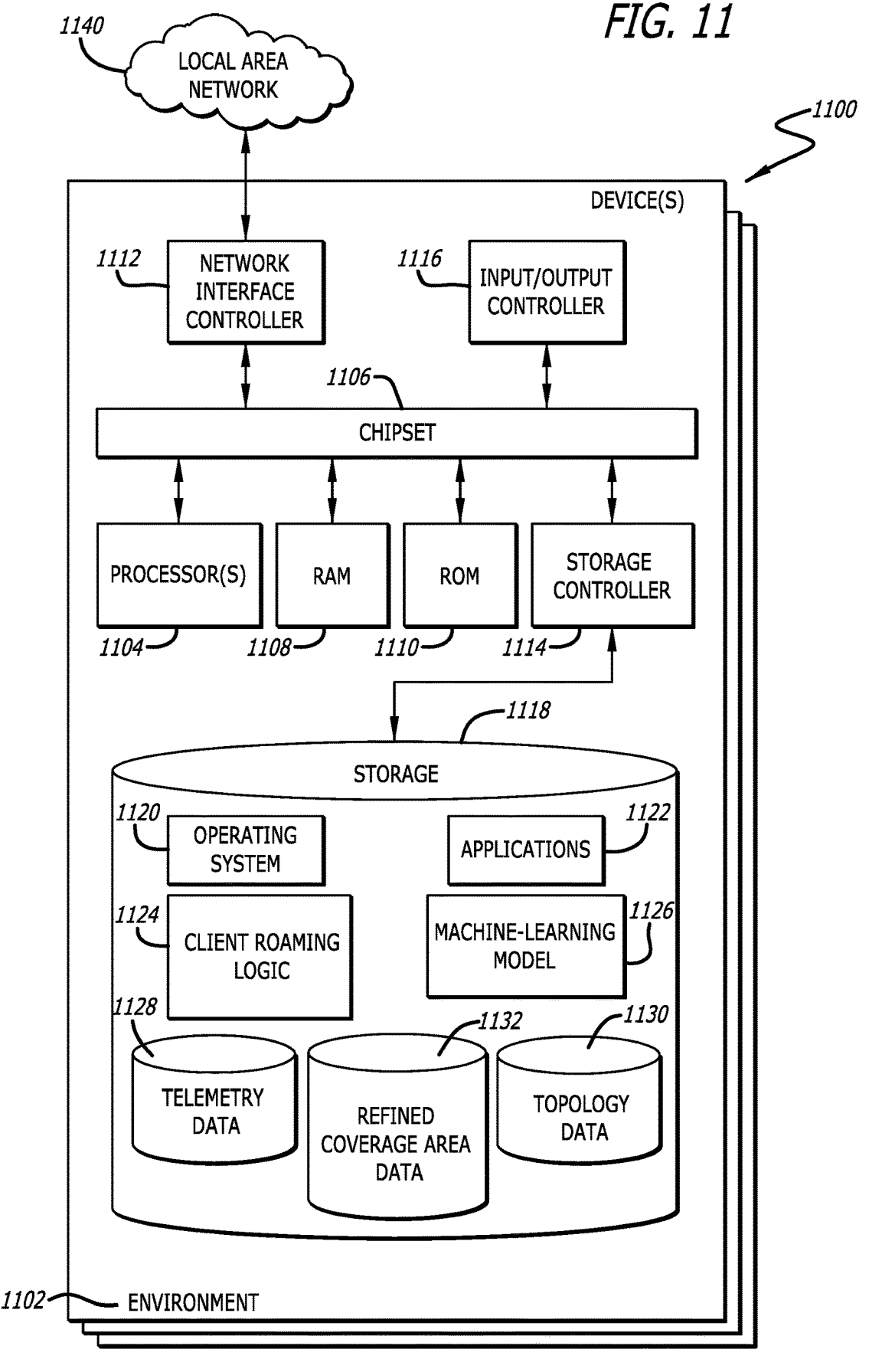
FIG. 11 is a conceptual block diagram of a device suitable for mitigating sticky clients using machine learning processes in accordance with various embodiments of the disclosure.

Referring to FIG. 11, a conceptual block diagram of a device suitable for mitigating sticky clients using machine learning processes in accordance with various embodiments of the disclosure is shown. The embodiment of the conceptual block diagram depicted in FIG. 11 can illustrate a conventional server computer, workstation, desktop computer, laptop, tablet, network device, router, switch, e-reader, smart phone, or other computing device, and can be utilized to execute any of the application and/or logic components presented herein. The device 1100 may, in some examples, correspond to physical devices and/or to virtual resources and embodiments described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the device 1100.

In additional embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the processor(s) 1104 and the remainder of the components and devices within the environment 1102. The chipset 1106 can provide an interface to communicatively couple a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the floorplan 100. The storage 1118 can, for example, store an operating system 1120, applications 1122, and telemetry data 1128, topology data 1130, refined coverage area data 1132, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more devices 1100 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-10. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11 or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

In many embodiments, the device 1100 can include a client roaming logic 1124 that can be configured to perform one or more of the various steps, processes, operations, and/or other methods that are described above. While the embodiment shown in FIG. 11 depicts a logic focused on floorplan mappings, it is contemplated that a more general "network needs" logic may be utilized as well or in lieu of such logic. Often, the client roaming logic 1124 can be a set of instructions stored within a non-volatile memory that, when executed by the controller(s)/processor(s) 1104 can carry out these steps, etc. In some embodiments, the network client roaming logic 1124 may be a client application that resides on a network-connected device, such as, but not limited to, a server, switch, personal or mobile computing device in a single or distributed arrangement. In certain embodiments, the client roaming logic 1124 can be a dedicated hardware device or be configured into a system on a chip package (FPGA, ASIC and the like).

In a number of embodiments, the storage 1118 can include telemetry data 1128. As discussed above, the refined coverage area data 1132 can be collected in a variety of ways and may involve data related to multiple levels of the mapping data. The refined coverage area data 1132 may be associated with an entire network or a portion/partition of a network. This may also include a relationship of the various associated APs that are associated with each other AP or network device such that relationships of how to transfer or "premove" clients back and forth can be determined based on the refined coverage area data 1132 as currently understood. In additional embodiments, the refined coverage area data 1132 can include not only the network devices and network traffic data associated within but may also include details about the hardware configuration and/or capabilities of the network devices within the floorplan. This can allow for more specific configurations based on various lower-power mode settings, or transceiver capabilities.

In various embodiments, the storage 1118 can include topology data 1130. As described above, topology data 1130 can be configured to include various items such as past need levels, client connection histories, as well as previously determined paths for those client connections. In some embodiments, each non-stationary client may be determined to follow one or more of a limited number of determined paths within the floorplan, which can indicate seasonality but also provide insight into predictions on where the client may need to be handed off to another AP or even pre-moved. For example, a mobile computing device like a smart phone can be held by a person walking through a typical path on a floorplan to go from one area to another. The limited number of paths within an office floorplan may indicate where that client may be moving toward. In some embodiments, external data, such as calendaring data can be accessed or stored in historical data to inform of patterns or paths that the client may take. In additional embodiments, topology data 1130 can be related to clients such that future predictions, such as with the ML, models 1126 can be utilized to better handle pre-moving clients when a known path is determined. Power measurement data 1131 may be represented as an RSSI value is usually expressed in dBm (decibels milliwatt) and provides an estimate of the signal's intensity, for example. Additionally, power measurement data may include other relevant metrics such as signal quality, noise levels, and signal-to-noise ratio (SNR). These measurements help assess the performance and reliability of the wireless connection, identify potential signal interferences or weaknesses, and guide decisions for optimizing the network's coverage and transmission power levels.

In still more embodiments, the storage 1118 can include refined coverage area data 1132. For example, refined coverage area data 1132 may include information regarding the layout and characteristics of a physical space within a building. This data may consist of the location and dimensions of rooms, walls, doors, and windows, providing a detailed representation of the indoor environment. Additionally, floorplan mapping data can incorporate the placement and coverage areas of wireless access points, routers, and other network devices. Signal strength measurements, signal propagation models, and coverage contours may also be part of the data, enabling a visualization of the wireless network's coverage and performance across the floorplan. This valuable information assists in identifying areas with strong or weak wireless connectivity, potential sources of interference, and aids network administrators in optimizing the network layout for improved user experience and efficient wireless communication.

As discussed above, a floorplan being managed by a hardware-based network device may have a fixed amount of computational resources available and/or only have access to a limited number of methods to generate predictions and confidence levels. However, a cloud-based network suite may have access to a large number of computations resources and methods to generate predictions and confidence levels. Refined coverage area data 1132 can be configured to capture these available resources and options. In still further embodiments, the refined coverage area data 1132 can be configured to capture what the latency needs, and selected options are for each network device within the floorplan.

Finally, in many embodiments, data may be processed into a format usable by a machine-learning model 1126 (e.g., feature vectors), and or other pre-processing techniques. The machine-learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126. The ML model 1126 may be configured to learn the pattern of the client traffic flow of various network devices and generate predictions and/or confidence levels regarding future network needs. In some embodiments, the ML model 1126 can be configured to determine which method of generating those predictions would work best based on certain conditions or with certain network devices.

The ML model(s) 1126 can be configured to generate inferences to make predictions or draw conclusions from data. An inference can be considered the output of a process of applying a model to new data. This can occur by learning from at least the topology data, historical data, and/or the algorithmic data and use that learning to predict future outcomes and needs. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc.

Although a specific embodiment for a device suitable for a conceptual block diagram of a device suitable for generating floorplans based on a plurality of tests frames is discussed with respect to FIG. 11, any of a variety of systems and/or processes may be utilized in accordance with embodiments of the disclosure. For example, the device may be in a virtual environment such as a cloud-based network administration suite, or it may be distributed across a variety of network devices or APs such that each acts as a device and client roaming logic 1124 acts in tandem between the devices. The elements depicted in FIG. 11 may also be interchangeable with other elements of FIGS. 1-10 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and
a memory communicatively coupled to the processor, wherein the memory comprises a client roaming logic that is configured to:
communicatively couple to a plurality of network devices, wherein each of the plurality of network devices has an associated modulation and coding ("MCS") rate;
generate a refined coverage area, wherein the refined coverage area is associated with a minimum MCS rate; and
disassociate from each of the plurality of network devices that have an MCS rate below the minimum MCS rate.

2. The device of claim 1, wherein the refined coverage area is defined as a disassociation threshold.

3. The device of claim 1, wherein the client roaming logic is further configured to determine a current MCS rate of each of the plurality of network devices.

4. The device of claim 3, wherein disassociation comprises comparing the determined current MCS rate of a network device against the minimum MCS rate.

5. The device of claim 1, wherein the refined coverage area is generated via one or more machine learning processes.

6. The device of claim 5, wherein the one or more machine learning processes includes at least a graph neural network.

7. The device of claim 1, wherein the client roaming logic is further configured to determine if a triggering event has occurred.

8. The device of claim 7, wherein, in response to a triggering event occurring, the client roaming logic is further configured to generate an updated refined coverage area.

9. The device of claim 8, wherein the updated refined coverage area is associated with a second minimum MCS rate.

10. The device of claim 9, wherein the client roaming logic is further configured to disassociate from each of the plurality of network devices that have an MCS rate below the second minimum MCS rate.

* * * * *